United States Patent
Kim et al.

(10) Patent No.: US 12,242,725 B2
(45) Date of Patent: Mar. 4, 2025

(54) ELECTRONIC DEVICE AND COMPUTING SYSTEM INCLUDING SAME

(71) Applicant: XCENA Inc., Gyeonggi-do (KR)

(72) Inventors: Ju Hyun Kim, Yongin-si (KR); Jin Yeong Kim, Yongin-si (KR); Jae Wan Yeon, Yongin-si (KR)

(73) Assignee: XCENA Inc., Seongnam-si (KR)

( * ) Notice: Subject to any disclaimer, the term of this patent is extended or adjusted under 35 U.S.C. 154(b) by 0 days.

(21) Appl. No.: 18/481,704

(22) Filed: Oct. 5, 2023

(65) Prior Publication Data

US 2024/0319878 A1    Sep. 26, 2024

(30) Foreign Application Priority Data

Mar. 20, 2023   (KR) .................. 10-2023-0035760

(51) Int. Cl.
*G06F 3/06* (2006.01)

(52) U.S. Cl.
CPC ............ *G06F 3/061* (2013.01); *G06F 3/0656* (2013.01); *G06F 3/0659* (2013.01); *G06F 3/0673* (2013.01)

(58) Field of Classification Search
CPC ...... G06F 3/061; G06F 3/0656; G06F 3/0659; G06F 3/0673
See application file for complete search history.

(56) References Cited

U.S. PATENT DOCUMENTS

| | | | | |
|---|---|---|---|---|
| 6,513,094 B1* | 1/2003 | Magro | ................ | G06F 13/1684 710/200 |
| 11,409,648 B2* | 8/2022 | Choi | ..................... | G06F 12/023 |
| 2003/0061457 A1* | 3/2003 | Geiger | ..................... | G06F 12/08 711/165 |
| 2003/0188110 A1* | 10/2003 | Abali | .................. | G06F 12/0802 711/E12.017 |
| 2007/0005911 A1* | 1/2007 | Yang | ........................ | G06F 12/08 711/202 |
| 2008/0133855 A1* | 6/2008 | Jeong | .................. | G06F 12/0802 711/161 |
| 2010/0274876 A1* | 10/2010 | Kagan | ................... | G06F 12/145 709/250 |
| 2013/0185474 A1* | 7/2013 | Ge | ....................... | G06F 9/45558 711/6 |
| 2014/0164686 A1* | 6/2014 | Choi | ..................... | G06F 3/0647 711/105 |

(Continued)

FOREIGN PATENT DOCUMENTS

| KR | 10-2008-0047096 A | 5/2008 |
|---|---|---|
| KR | 10-2012-0066198 A | 6/2012 |

(Continued)

OTHER PUBLICATIONS

Freedman, Michael & Tr, Recitation. (2001). The Compression Cache: Virtual Memory Compression for Handheld Computers. (Year: 2001).*

(Continued)

*Primary Examiner* — Ramon A. Mercado
(74) *Attorney, Agent, or Firm* — Sughrue Mion, PLLC

(57) ABSTRACT

As one aspect of the present disclosure, an electronic device is disclosed. The device may include: a volatile memory device; and a controller configured to be connected with a host processor and the volatile memory device, wherein the controller may be further configured to receive a swap-out request for first data in pages from the host processor, generate first compressed data by compressing the first data in response to the swap-out request, and store the first compressed data in the volatile memory device.

15 Claims, 10 Drawing Sheets

(56) References Cited

U.S. PATENT DOCUMENTS

| | | | | |
|---|---|---|---|---|
| 2015/0301843 A1* | 10/2015 | Guo | ...................... | G06F 9/5016 |
| | | | | 718/1 |
| 2016/0077946 A1* | 3/2016 | Raikin | ................ | G06F 12/1009 |
| | | | | 710/14 |
| 2020/0004621 A1* | 1/2020 | Athmaram | .......... | G06F 11/3058 |
| 2021/0318819 A1* | 10/2021 | Mun | ..................... | G06F 3/0653 |
| 2022/0206961 A1* | 6/2022 | Lempel | ............... | G06F 12/1441 |
| 2022/0350531 A1* | 11/2022 | Wang | .................... | G06F 3/0659 |

FOREIGN PATENT DOCUMENTS

| | | |
|---|---|---|
| KR | 10-2018-0044095 A | 5/2018 |
| KR | 10-2254099 B1 | 5/2021 |
| KR | 10-2021-0126925 A | 10/2021 |
| KR | 10-2021-0126984 A | 10/2021 |
| KR | 10-2434170 B1 | 8/2022 |

OTHER PUBLICATIONS

T.Cortes, Y.Becerra, and R. Cervera, "Swap Compression: Resurrecting OldIdears," in Software-Practice and Experience Journal, No. 30, pp. 567-587, Jun. 2000. (Year: 2000).*

Douglis, The Compression Cache: Using On-Line Compression to Extend Physical Memory, USENIX, Jan. 1993. (Year: 1993).*

Request for submission of opinion for KR 10-2023-0035760 dated Jun. 5, 2023.

Written decision on registration for KR 10-2023-0035760 dated Jul. 21, 2023.

* cited by examiner

ELECTRONIC DEVICE AND COMPUTING SYSTEM INCLUDING SAME

CROSS-REFERENCE TO RELATED APPLICATION

This application claims priority under 35 U.S.C § 119 to Korean Patent Application No. 10-2023-0035760, filed on Mar. 20, 2023, in the Korean Intellectual Property Office, the entire contents of which is hereby incorporated by reference.

TECHNICAL FIELD

The present disclosure relates to electronic devices and computing systems including the same.

BACKGROUND

A memory (e.g., DRAM) connected directly to a host CPU is a resource that is fast but very expensive and limited in capacity. For this reason, various techniques are used to make the most of the host memory. For example, the swap technique is a method in which pages, which are not frequently used or to which there has not been an access request recently, of a memory area used by an application are stored in a storage device (swap out), thereby making the corresponding pages available for other purposes. The swap technique has the advantage of allowing the maximum utilization of host memory, but may result in extreme performance degradation if swapping is frequent due to the relatively low performance of storage devices, the input/output overhead, and input/output bottlenecks.

In order to compensate for the drawbacks of the swap technique, recently, a zswap method is often utilized that allows faster swap-in/out than the storage device by compressing data before swapping out to a storage device and then storing it in some areas of the host memory. Because the zswap method uses the host memory without sending data down to the storage device, relatively high performance can be expected. However, there was a problem that memory availability was reduced in that CPU resources were consumed additionally to perform data compression and some areas of the host memory were used for storing compressed pages.

SUMMARY

It is a technical object of the present disclosure to provide an electronic device capable of offloading at least part of an existing zswap function implemented using host CPU and memory resources.

It is another technical object of the present disclosure to provide an electronic device capable of using resources of a host memory efficiently through compression while expanding the capacity of the host memory.

It is yet another technical object of the present disclosure to improve the performance of the entire computing system by allowing a host CPU to be utilized for processing other than compression by providing an electronic device that takes over the compression operation of the host CPU.

It is still another technical object of the present disclosure to resolve an input/output bottleneck of a main system and improve performance by providing an electronic device that directly controls a storage device.

The present disclosure may be implemented in a variety of ways, including devices, systems, methods, or computer programs stored on a readable storage medium.

As one aspect of the present disclosure, an electronic device for compressing and storing data is disclosed. The device may include: a volatile memory device; and a controller configured to be connected with a host processor and the volatile memory device, wherein the controller may be further configured to receive a swap-out request for first data in pages from the host processor, generate first compressed data by compressing the first data in response to the swap-out request, and store the first compressed data in the volatile memory device.

In one embodiment, the controller may divide and manage the volatile memory device into a compressed memory pool and a temporary memory pool.

In one embodiment, the controller may: store the first data in a first temporary buffer in the temporary memory pool, store the first compressed data in a second temporary buffer in the temporary memory pool, and store the first compressed data stored in the second temporary buffer in a storage area in the compressed memory pool.

In one embodiment, a size of the storage area may correspond to a size of the first compressed data.

In one embodiment, the controller may: record a location of the storage area in metadata of the first data, and notify the host processor of completion of processing of the swap-out request.

In one embodiment, the controller may: receive a swap-in request for second data in pages from the host processor, generate decompressed data by decompressing second compressed data in which the second data is compressed in response to the swap-in request, and transfer the decompressed data to the host processor.

In one embodiment, the controller may: store the decompressed data in a third temporary buffer of a page size in the temporary memory pool, and transfer the decompressed data stored in the third temporary buffer to the host processor.

In one embodiment, the controller may: notify the host processor of completion of processing of the swap-in request, and initialize metadata of the second data.

In one embodiment, the controller may include: a swap controller configured to request allocation of a memory space of the volatile memory device based on page information on the first data included in the swap-out request and control compression of the first data; a memory manager configured to secure an empty space in the volatile memory device according to a determination of the swap controller; and a compression and decompression module configured to compress the first data according to the determination of the swap controller.

In one embodiment, the controller may include: a direct memory access (DMA) module configured to receive data to be swapped out from the host processor or transmit data to be swapped in to the host processor by using a predetermined protocol.

In one embodiment, the controller may include: a cache memory configured to store data that has ever been accessed or is expected to be accessed; and a memory controller configured to be connected with the volatile memory device and the cache memory.

In one embodiment, the controller may include: a swap controller configured to identify a storage location of the second compressed data in the volatile memory device based on page information on the second data included in the swap-in request and metadata of the second data, and control decompression of the second compressed data; a memory manager configured to secure an empty space in the volatile memory device according to a determination of the swap controller; and a compression and decompression module configured to decompress the second compressed data according to the determination of the swap controller.

In one embodiment, the controller may: transfer a size of the first compressed data to the host processor, receive an address where the first compressed data is to be stored from the host processor, and store the first compressed data at the received address.

In one embodiment, the controller may: determine cold data out of data stored in the compressed memory pool in the volatile memory device, and transmit the cold data to a non-volatile storage device configured to be connected to the controller.

In one embodiment, the controller may: determine cold data out of data stored in the compressed memory pool in the volatile memory device, generate decompressed data by decompressing the cold data, and transmit the decompressed data to a non-volatile storage device configured to be connected to the controller.

In one embodiment, the controller may be connected with an external electronic device, and the controller may receive a swap-out request for third data in pages from the external electronic device, generate third compressed data by compressing the third data in response to the swap-out request for the third data, and store the third compressed data in the volatile memory device.

In one embodiment, the controller may be connected with an external electronic device, and the controller may receive a swap-in request for fourth data in pages from the external electronic device, generate decompressed data by decompressing fourth compressed data in which the fourth data is compressed in response to the swap-in request, and transfer the decompressed data to the external electronic device.

According to another aspect of the present disclosure, a computing system is disclosed. The system may include: a host processor; and an electronic device, and the electronic device may include: a volatile memory device; and a controller configured to be connected with a host processor and the volatile memory device, wherein the controller may be further configured to receive a swap-out request for first data in pages from the host processor, generate first compressed data by compressing the first data in response to the swap-out request, and store the first compressed data in the volatile memory device.

According to various embodiments of the present disclosure, at least part of the existing zswap function implemented using host processor and host memory resources can be offloaded.

According to various embodiments of the present disclosure, the resources of the host memory can be used efficiently through compression while expanding the capacity of the host memory.

According to various embodiments of the present disclosure, the performance of the entire computing system can be improved by allowing the host processor to be utilized for processing other than compression by providing an electronic device that takes over at least part of the compression operation function of the host processor.

According to various embodiments of the present disclosure, it is possible to eliminate input/output bottlenecks with the host processor and improve performance by providing an electronic device capable of directly controlling a non-volatile storage device.

The effects of the present disclosure are not limited to those mentioned above, and other effects that have not been mentioned will be clearly understood by those skilled in the art to which the present disclosure pertains (hereinafter referred to as a 'person of ordinary skill') from the description of the claims.

DETAILED DESCRIPTION OF THE PREFERRED EMBODIMENTS

Figure 1:
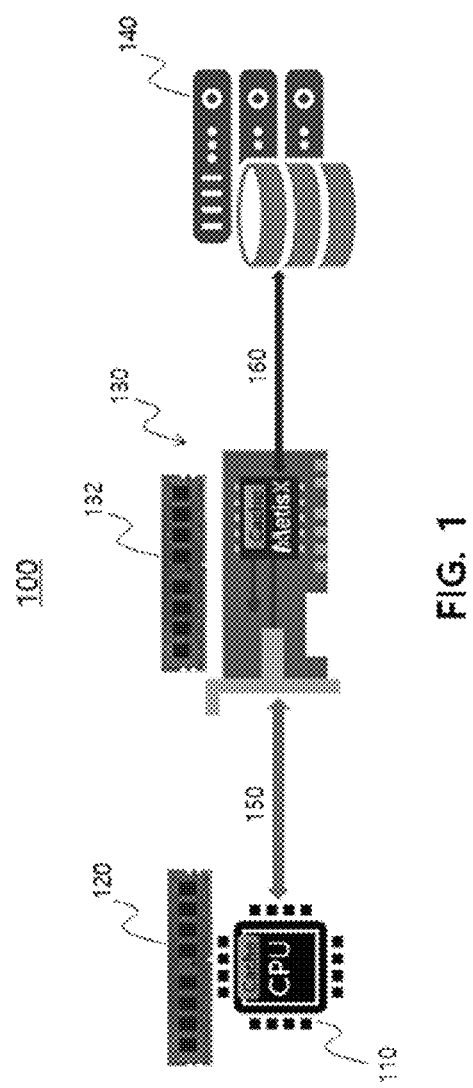
FIG. 1 is an example diagram conceptually illustrating a computing system including an electronic device in accordance with one embodiment of the present disclosure.

Various embodiments set forth herein are illustrated for the purpose of clearly describing the technical ideas of the present disclosure, and are not intended to be limited to particular embodiments. The technical ideas of the present disclosure include various modifications, equivalents, and alternatives of each embodiment set forth herein, and embodiments obtained by selectively combining all or part of each embodiment. In addition, the scope of the technical ideas of the present disclosure is not limited to various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural.

Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

FIG. 1 is an example diagram conceptually illustrating a computing system 100 including an electronic device 130 according to one embodiment of the present disclosure.

A computing system 100 in accordance with the present disclosure may be a storage server or other kind of server that may be used in a data center. As shown in FIG. 1, the computing system 100 may include a host processor 110 (e.g., x86 CPU, ARM, RISC-V), an electronic device 130, and a non-volatile storage device 140. The host processor 110 may be connected to a host memory 120. The electronic device 130 may include a volatile memory device 132.

The computing system 100 in accordance with the present disclosure may have a scalable device structure that can use the volatile memory device 132 of the electronic device 130 as an intermediate storage medium and the non-volatile storage device 140 as a final storage medium. The host processor 110 may recognize the total capacity of the non-volatile storage device 140 connected to the electronic device 130.

The host processor 110 may communicate with the electronic device 130 by using a first interface 150. The first interface 150 may be a serial interface, and may be, for example, an interface using PCIe or a compute express link (CXL) protocol. The electronic device 130 may communicate with the non-volatile storage device 140 by using a second interface 160. The second interface 160 may be a serial interface.

In the computing system 100 in accordance with the present disclosure, the first interface 150 may be a byte-addressable protocol (or byte addressing protocol), and the second interface 160 may be a block-addressable protocol (or block addressing protocol). The host processor 110 may assign addresses in bytes and read and write data to the electronic device 130. The electronic device 130 may assign addresses in blocks and read and write data to the non-volatile storage device 140. The electronic device 130 may retrieve data in blocks from the non-volatile storage device 140 based on the byte addresses and store the data in the volatile memory device 132 of the electronic device 130. The electronic device 130 may access data corresponding to the address requested by the host processor 110 out of data stored in the volatile memory device 132.

According to one embodiment, the electronic device 130 may internally have a cache for data stored in the volatile memory device 132 to improve performance.

FIG. 1 illustrates that the non-volatile storage device 140 is configured separately from the electronic device 130 for the convenience of description. However, the present disclosure is not limited thereto. For example, in the present disclosure, the non-volatile storage device 140 may be configured to be integrated with the electronic device 130.

Figure 2:
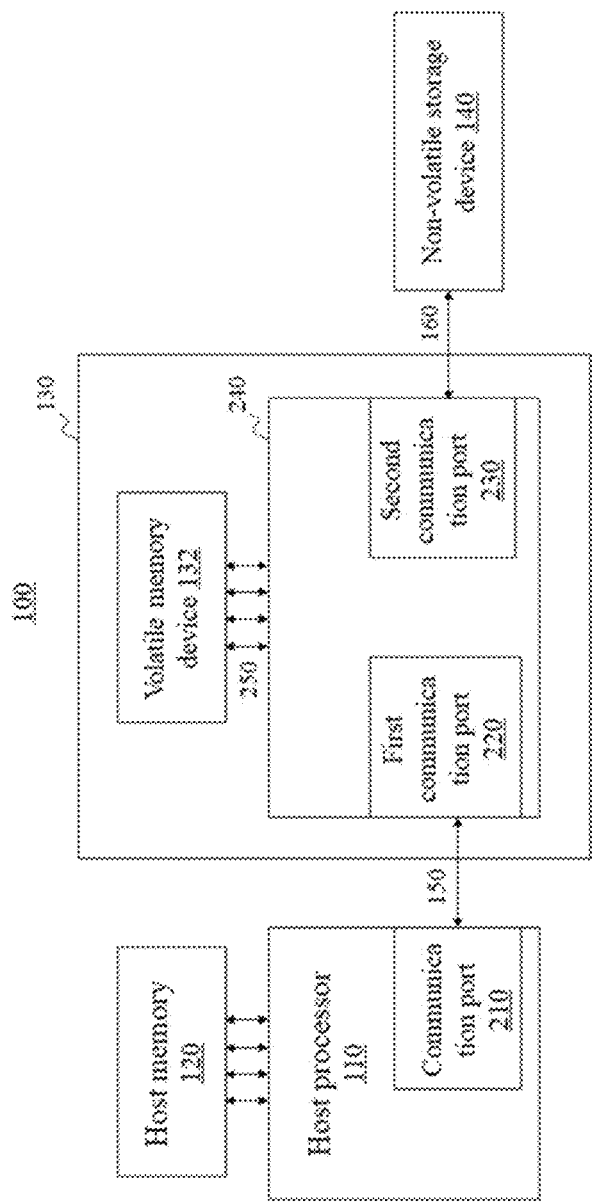
FIG. 2 is a block diagram of a computing system including an electronic device in accordance with one embodiment of the present disclosure.

FIG. 2 is a block diagram of a computing system 100 including an electronic device 130 in accordance with one embodiment of the present disclosure.

As shown in FIG. 2, the computing system 100 includes a host processor 110, an electronic device 130, and a non-volatile storage device 140. The host processor 110 may include a communication port 210. The electronic device 130 may include a volatile memory device 132 and a controller 240.

The host processor 110 may refer to a set of one or more processors. The host processor 110 may control at least one component of a device or terminal (e.g., the electronic device 130) connected to the host processor 110 by driving software (e.g., commands, programs, etc.). In addition, the host processor 110 may perform operations such as various computations, processing, data generation or processing. Further, the host processor 110 may load data or the like from various memory devices or storage devices, or store data or the like in the memory devices or storage devices.

The controller 240 may have one or more volatile memory channels, and may communicate with individual components or the volatile memory device 132 via these volatile memory channels. The volatile memory device 132 may be, for example, a DIMM-type DRAM. The controller 240 may include a first communication port 220. For example, the first communication port 220 may be a PCIe end point or a CXL end point. According to one embodiment, the controller 240 may further include a second communication port 230. For example, the second communication port 230 may be a PCIe root complex port.

The controller 240 may communicate with the host processor 110 over a first interface 150 via the first communication port 220 and the communication port 210. Further, the controller 240 may communicate with the volatile memory device 132 over a third interface 250. In addition, the controller 240 may communicate with the non-volatile storage device 140 over a second interface 160 via the second communication port 230. Here, the first interface 150 and the second interface 160 may be serial interfaces, and the third interface 250 may be a parallel interface.

The controller 240 may communicate with the host processor 110 in a first protocol. Further, the controller 240 may communicate with the volatile memory device 132 in a second protocol. Moreover, the controller 240 may communicate with the non-volatile storage device 140 in a third protocol. Here, the first protocol and the second protocol may be byte-addressable protocols that allow data to be read and written by assigning addresses in bytes, and the third protocol may be a block-addressable protocol that allows data to be read and written by assigning addresses in blocks.

The non-volatile storage device 140 may include one or more non-volatile storages. According to one embodiment, as many non-volatile storages as the interfaces allow may be connected directly to the second communication port 230. Here, the non-volatile storages may include hard disk drives (HDDs), solid-state drives (SSDs), and the like.

The controller 240 in accordance with the present disclosure may receive a swap-out request or command for data in pages (hereinafter referred to as 'page data') from the host processor 110. According to one embodiment, the host operating system (OS) may determine page data to be swapped out. For example, the host operating system may determine to swap out the page data that has not been accessed for a predetermined period of time or has a low frequency of accesses out of page data stored in the host memory 120. The host processor 110 may transfer the swap-out request including page information to the controller 240 via the communication port 210 and the first communication port 220. For example, the page information may include a process ID and an address for each program.

The controller 240 may determine the availability of the volatile memory device 132 in response to the swap-out request. If it is determined that the volatile memory device 132 is not available, the controller 240 may transfer an error message (e.g., a memory full error) to the host processor 110. If it is determined that the volatile memory device 132 is available, the controller 240 may receive the page data from the host processor 110 and compress and store it in the volatile memory device 132.

The controller 240 in accordance with the present disclosure may divide and manage the volatile memory device 132 into a compressed memory pool and a temporary memory pool. For example, the controller 240 may define and manage a first area of the volatile memory device 132 as a compressed memory pool, and define and manage a second area that is different from the first area as a temporary memory pool. When storing certain data in the volatile memory device 132, the controller 240 may determine to store the data in the compressed memory pool or the temporary memory pool depending on whether the data is compressed.

According to one embodiment, the controller 240 may store the page data requested to be swapped out in a first temporary buffer in the temporary memory pool. For example, the size of the first temporary buffer may be allocated to be the same as that of the page data (e.g., 4 KB). The controller 240 may store the page data requested to be swapped out in a first temporary buffer in the temporary memory pool. The controller 240 may compress and store the page data stored in the first temporary buffer in a second temporary buffer in the temporary memory pool. For example, the size of the second temporary buffer may be allocated to be the same as that of the first temporary buffer (e.g., 4 KB). The controller 240 may store the compressed data stored in the second temporary buffer in a storage area in the compressed memory pool. The size of the storage area may correspond to the size of compressed data. For example, the size of the storage area may be equal to or proportional to the size of compressed data. The controller 240 may record the location of the storage area in the metadata of the page data requested to be swapped out. In addition, the controller 240 may notify the host processor 110 of the completion of processing of the swap-out request.

In general, even if data of the same size are compressed, the sizes of compressed data generated as a result of compression may be different. According to the controller 240 in accordance with the present disclosure, after compressing the page data in the temporary memory pool and identifying the size of the compressed data, a size corresponding to the size of the compressed data may be allocated in the compressed memory pool and the compressed data may be stored. With this configuration, effective management of the compressed memory pool is possible, and the availability of the compressed memory pool can be increased.

The controller 240 in accordance with the present disclosure may receive a swap-in request or command of data in pages from the host processor 110. According to one embodiment, the host operating system may determine the page data to be swapped in and the location where it is to be stored in the host memory 120. The host processor 110 may transfer the swap-in request including the page information and location information on the host memory 120 to the controller 240 via the communication port 210 and the first communication port 220. For example, the page information may include a process ID and an address for each program.

The controller 240 may search for the compressed data in which the page data is compressed in response to the swap-in request. According to one embodiment, the controller 240 may identify the location of the compressed data in the volatile memory device 132 based on the page information and the metadata of the page data. The compressed data may be located in the compressed memory pool of the volatile memory device 132. According to one embodiment, the controller 240 may decompress and store the compressed data in a temporary buffer in the temporary memory pool. For example, the size of the temporary buffer may be allocated to be the same as the page data (e.g., 4 KB).

The controller 240 may transfer the decompressed data to the host processor 110. For example, the controller 240 may transfer the decompressed data to the location information on the host memory 120 included in the swap-in request. The controller 240 may notify the host processor 110 of the completion of processing of the swap-in request. In addition, the controller 240 may initialize the information of the metadata of the page data requested to be swapped in.

According to the computing system 100 in accordance with the present disclosure, since the host processor 110 does not have to directly perform a compression operation function or manage compressed data, overall system availability can be improved. In addition, since the electronic device 130 in accordance with the present disclosure provides offloading to the compression function and data transmission while expanding the capacity of the host memory 120, overall system performance can be improved.

Figure 3:
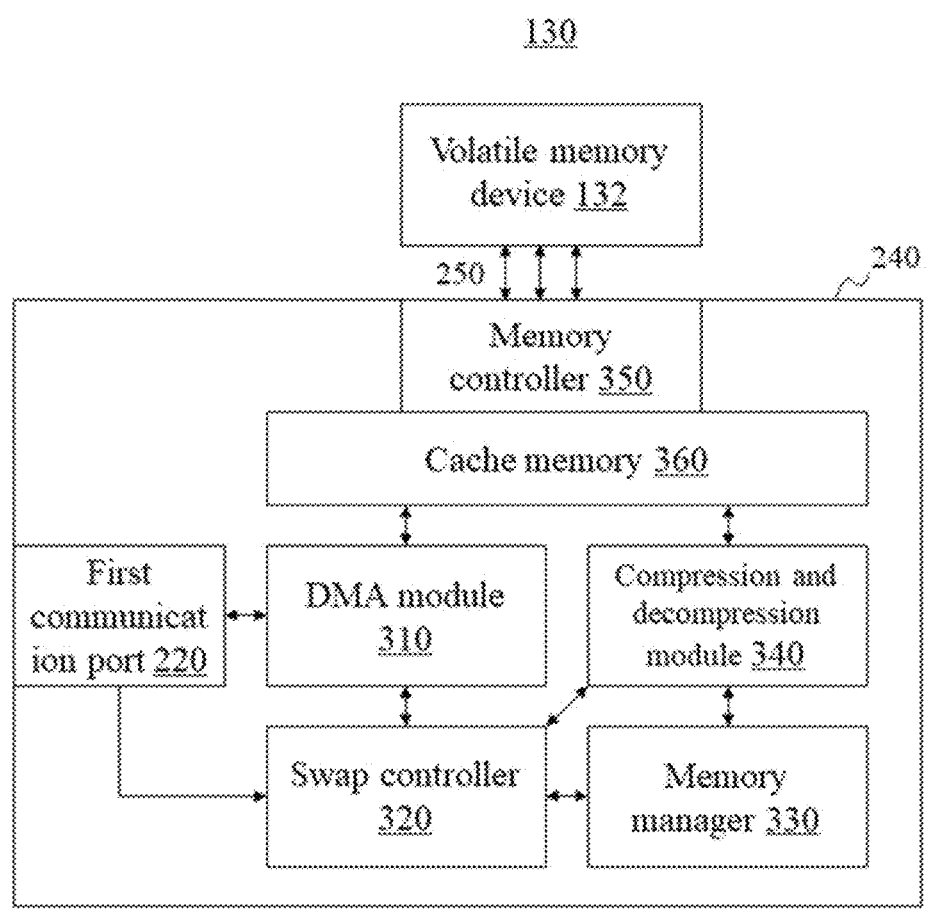
FIG. 3 is a block diagram of a controller in accordance with one embodiment of the present disclosure.

FIG. 3 is a block diagram of a controller 240 in accordance with one embodiment of the present disclosure.

As shown in FIG. 3, the controller 240 may include a swap controller 320 (or may also be referred to as a 'zswap controller'), a memory manager 330, and a compression and decompression module 340. In addition, the controller 240 may further include a direct memory access (DMA) module 310, a memory controller 350, and a cache memory 360.

In order to process the swap-out request of the host processor 110, the swap controller 320 may request allocation of a memory space in the volatile memory device 132 based on the page information on the page data included in the swap-out request and may control compression of the page data. The memory manager 330 may secure an empty space in the volatile memory device 132 according to the determination of the swap controller 320. The memory manager 330 may divide and manage the volatile memory device 132 into a compressed memory pool and a temporary memory pool. The compression and decompression module 340 (or a compressor included in the compression and decompression module 340) may compress the page data according to the determination of the swap controller 320.

In order to process the swap-in request of the host processor 110, the swap controller 320 may identify the storage location of the compressed data of the corresponding page data in the volatile memory device 132 based on the page information on the page data included in the swap-in request and the metadata of the page data. The swap controller 320 may control the decompression of the compressed data. The memory manager 330 may secure an empty space in the volatile memory device 132 according to the determination of the swap controller 320. The compression and decompression module 340 (or a decompressor included in the compression and decompression module 340) may decompress the compressed data according to the determination of the swap controller 320.

The DMA module 310 may receive data to be swapped out from the host processor 110 or transmit data to be swapped in by using a predetermined protocol. In addition, the cache memory 360 may be configured to store data that has ever been accessed or is expected to be accessed. The memory controller 350 may be connected with the volatile memory device 132 and the cache memory 360. The memory controller 350 may be configured to access the volatile memory device 132 and allow a data read or write.

The DMA module 310, the swap controller 320, the memory manager 330, the compression and decompression module 340, and the memory controller 350 shown in FIG. 3 may each be implemented as a hardware device or software code. According to one embodiment, the DMA module may be implemented as a hardware device, and the other components may be implemented as software code. According to one embodiment, the compression and decompression module 340 may be implemented as a mixture of hardware devices and software code. For example, the decompressor of the compression and decompression module 340 may be implemented as hardware, and the compressor may be implemented as software. In addition, FIG. 3 illustrates the components of the controller 240 by way of example, and the present disclosure is not limited thereto. For example, it may be implemented such that some of the components shown in FIG. 3 may be omitted or functions of particular components may be included in other components.

In the following, a process in which a swap-out request is processed in the electronic device 130 will be described with reference to FIGS. 4 and 5, and a process in which a swap-in request is processed in the electronic device 130 will be described with reference to FIGS. 6 and 7.

Figure 4:
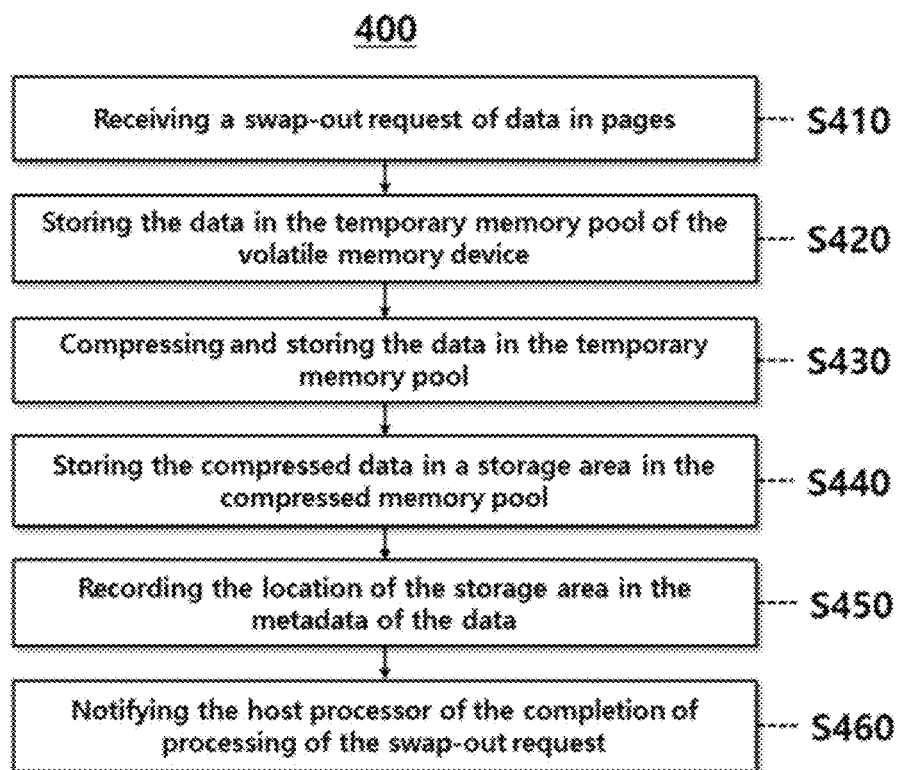
FIG. 4 is a flowchart regarding an operation in which a controller processes a swap-out request according to one embodiment of the present disclosure.
Figure 5:
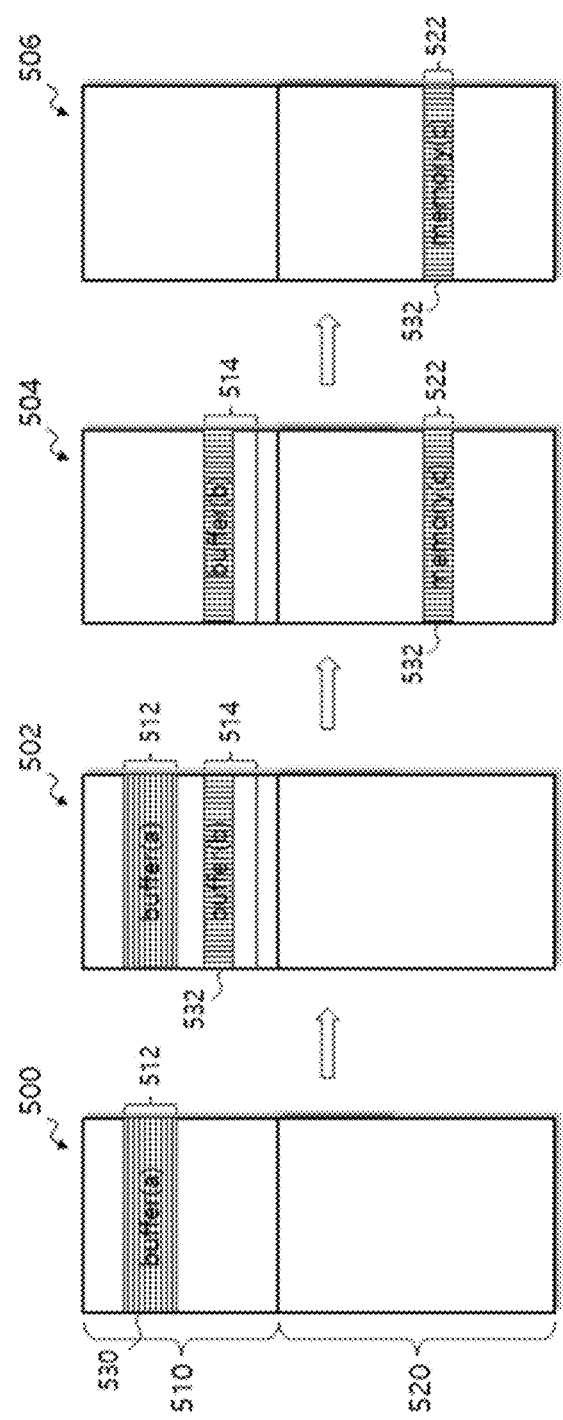
FIG. 5 is a diagram for describing an operation in which data to be swapped out is compressed in a volatile memory device according to one embodiment of the present disclosure.

FIG. 4 is a flowchart 400 regarding an operation in which a controller 240 processes a swap-out request according to one embodiment of the present disclosure, and FIG. 5 is a diagram for describing an operation in which data to be swapped out is compressed in a volatile memory device 132 according to one embodiment of the present disclosure.

The controller 240 may receive a swap-out request of data in pages from the host processor 110 (S410). According to one embodiment, the host operating system may determine to swap out predetermined page data. The swap controller 320 may receive information on page data to be swapped out from the host processor 110 via the communication port 210 and the first communication port 220. The swap controller 320 may determine the availability of the volatile memory device 132. If it is determined that the volatile memory device 132 is not available, the swap controller 320 may return an error message (e.g., a memory full error) to the host processor 110. If it is determined by the swap controller 320 that the volatile memory device 132 is available, the process may proceed to the next step S420.

Next, the controller 240 may store the page data in the temporary memory pool of the volatile memory device 132

(S420). According to one embodiment, the swap controller 320 may request the memory manager 330 to allocate a temporary buffer in the temporary memory pool. The memory manager 330 may allocate a first temporary buffer in the temporary memory pool of the volatile memory device 132 according to the request of the swap controller 320. Once the allocation of the first temporary buffer is completed, the swap controller 320 may request the DMA module 310 to receive the page data. The DMA module 310 may receive the page data to be swapped out from the host processor 110 or the host memory 120 via the first communication port 220 according to the request of the swap controller 320. The DMA module 310 may store the received page data in the first temporary buffer of the volatile memory device 132 allocated by the memory manager 330.

Referring to FIG. 5, the memory manager 330 allocates a temporary buffer (a) 512 of a predetermined size (e.g., 4 KB) in the temporary memory pool 510 of the volatile memory device 500. The page data 530 to be swapped out may be stored in the temporary buffer (a) 512.

Next, the controller 240 may compress and store the page data in the temporary memory pool (S430). According to one embodiment, the swap controller 320 may request allocation of a temporary buffer that is different from the first temporary buffer in the temporary memory pool of the memory manager 330. The memory manager 330 may allocate a second temporary buffer in the temporary memory pool of the volatile memory device 132 according to the request of the swap controller 320. Once the allocation of the second temporary buffer is completed, the swap controller 320 may request the compression and decompression module 340 (or the compressor included in the compression and decompression module 340) to compress for the first temporary buffer. The compression and decompression module 340 may compress and store the page data stored in the first temporary buffer in the second temporary buffer. The compression and decompression module 340 may identify the size of compressed data in which the page data is compressed. The compression and decompression module 340 may transfer the size of the compressed data identified to the swap controller 320.

Referring to FIG. 5, the memory manager 330 allocates a temporary buffer (b) 514 of a predetermined size (e.g., 4 KB) in the temporary memory pool 510 of the volatile memory device 502. The compressed data 532 of the page data 530 may be stored in the temporary buffer (b) 514.

According to one embodiment, the size of the temporary buffer (b) 514 may be set to be equal to the size of the temporary buffer (a) 512. As shown in FIG. 5, as a result of compression by the compression and decompression module 340, the size of the compressed data 532 (e.g., 2.4 KB) may be less than the size of the temporary buffer (b) 514. In contrast, if the size of the compressed data 532 is greater than the size of the temporary buffer (b) 514 as a result of the compression by the compression and decompression module 340, the compressed data may not be stored in the temporary buffer (b) 514. In this case, the compression and decompression module 340 may transfer an error message (e.g., compression failed or data capacity exceeded) to the swap controller 320. With this configuration, it is possible to recognize or prevent the case where the size of compressed data gets larger than the size of data before compression. As a result, the volatile memory device 132 can be managed more efficiently.

Next, the controller 240 may store the compressed data in a storage area in the compressed memory pool (S440).

According to one embodiment, the swap controller 320 may request allocation of a storage area in the compressed memory pool of the memory manager 330. For example, the size of the storage area may be equal to that of the compressed data or may be related to the size of the compressed data. The memory manager 330 may allocate a storage area in the compressed memory pool of the volatile memory device 132 according to the request of the swap controller 320. Once the allocation of the storage area is completed, the swap controller 320 may copy the compressed data stored in the second temporary buffer to the storage area.

Referring to FIG. 5, the memory manager 330 allocates a storage area (c) 522 as large as the size of the compressed data (e.g., 2.4 KB) in the compressed memory pool 520 of the volatile memory device 504. The compressed data 532 may be stored in the storage area (c). With this configuration, a memory space can be allocated in the compressed memory pool only as large as the size of the compressed data, allowing for more efficient management of memory resources.

The swap controller 320 may request the memory manager 330 to deallocate the first temporary buffer. The memory manager 330 may return the first temporary buffer to the temporary memory pool at the request of the swap controller 320. For example, the deallocation time point of the first temporary buffer may be any one of after the compressed data is stored in the second temporary buffer, after the storage area is allocated, and after the compressed data is copied to the storage area. In addition, the swap controller 320 may request the memory manager 330 to deallocate the second temporary buffer. The memory manager 330 may return the second temporary buffer to the temporary memory pool at the request of the swap controller 320. For example, the deallocation time point of the second temporary buffer may be after the compressed data is copied to the storage area.

Referring to FIG. 5, the memory manager 330 may return the temporary buffer (a) 512 to the temporary memory pool 510 of the volatile memory device 504 at any one time point of after the compressed data 532 is stored in the temporary buffer (b) 514, after the storage area (c) 522 is allocated, and after the compressed data 532 is copied to the storage area (c) 522. In addition, the memory manager 330 may return the temporary buffer (b) 514 to the temporary memory pool 510 of the volatile memory device 506 at a time point after the compressed data 532 is copied to the storage area (c) 522. With this configuration, temporary buffers in the temporary memory pool are always returned when a series of compression and storage processes are completed, allowing for more efficient management of memory resources.

Next, the controller 240 may record the location of the storage area in the metadata of the page data (S450). According to one embodiment, the swap controller 320 may record the location of the storage area in which the compressed data is stored in the metadata of the page data requested to be swapped out. For example, the metadata may be stored in one area of the volatile memory device 132. The metadata may be called by the host processor 110.

Next, the controller 240 may notify the host processor 110 of the completion of processing of the swap-out request (S460). According to one embodiment, the swap controller 320 may notify the host processor 110 of the completion of processing of the swap-out request. The host operating system may recognize that the swap-out request has been processed.

Since the electronic device 130 in accordance with the present disclosure can take over at least part of the compression operation function of the host processor 110, the performance of the entire computing system 100 can be improved by allowing the host processor 110 to be utilized for processing other than compression.

Figure 6:
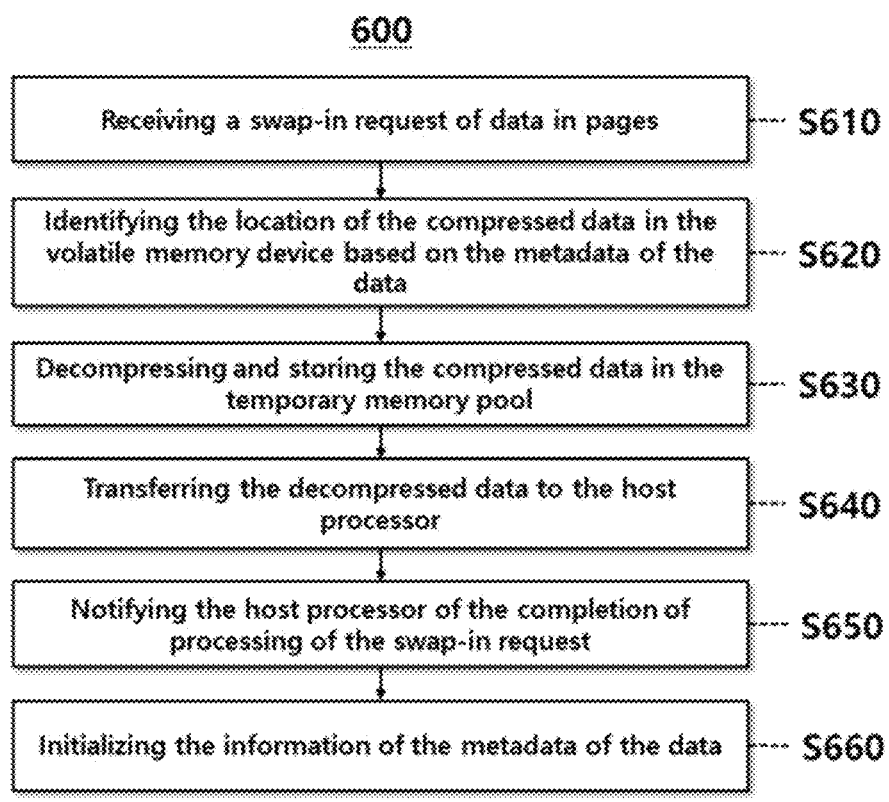
FIG. 6 is a flowchart regarding an operation in which a controller processes a swap-in request according to one embodiment of the present disclosure.
Figure 7:
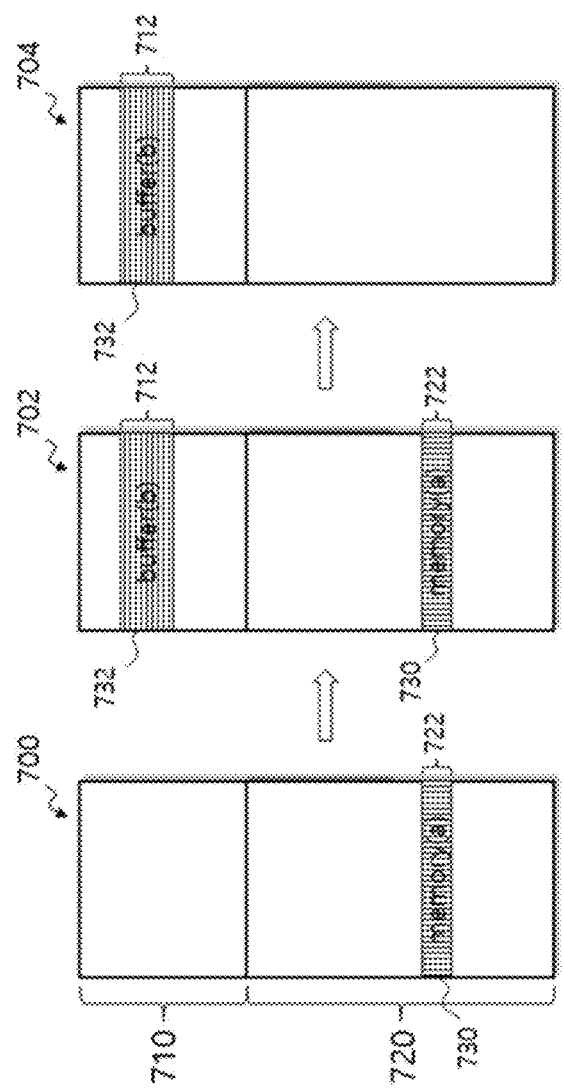
FIG. 7 is a diagram for describing an operation in which data to be swapped in is decompressed in a volatile memory device according to one embodiment of the present disclosure.

FIG. 6 is a flowchart 600 regarding an operation in which a controller 240 processes a swap-in request according to one embodiment of the present disclosure, and FIG. 7 is a diagram for describing an operation in which data to be swapped in is decompressed in a volatile memory device 132 according to one embodiment of the present disclosure.

The controller 240 may receive a swap-in request of data in pages (S610). According to one embodiment, the host operating system may determine a swap-in of predetermined page data. The swap controller 320 may receive information on the page data to be swapped-in (or page information) and location information to be stored in the host memory 120 from the host processor 110 via the communication port 210 and the first communication port 220. For example, the page information may include a process ID and an address for each program.

Next, the controller 240 may identify the location of the compressed data in the volatile memory device 132 based on the metadata of the data (S620). According to one embodiment, the swap controller 320 may identify the location of the compressed data in the volatile memory device 132 based on the page information and the metadata of the page data. For example, the metadata of the page data might have been recorded by the swap controller 320 when the corresponding page data was swapped out. The compressed data may be located in the compressed memory pool of the volatile memory device 132.

Referring to FIG. 7, the swap controller 320 may identify the location of the storage area (a) 722 in which the compressed data 730 is stored in the compressed memory pool 720 of the volatile memory device 700. For example, the size of the storage area (a) 722 (e.g., 2.4 KB) may be equal to that of the compressed data 730.

Next, the controller 240 may decompress and store the compressed data in the temporary memory pool (S630). According to one embodiment, the swap controller 320 may request the memory manager 330 to allocate a temporary buffer in the temporary memory pool. The memory manager 330 may allocate a temporary buffer in the temporary memory pool of the volatile memory device 132 at the request of the swap controller 320. Once the allocation of the temporary buffer is completed, the swap controller 320 may request the compression and decompression module 340 (or the decompressor included in the compression and decompression module 340) to decompress for the temporary buffer. The compression and decompression module 340 may decompress the compressed data stored in the storage area and store it in the temporary buffer.

Referring to FIG. 7, the memory manager 330 allocates a temporary buffer (b) 712 of a predetermined size (e.g., 4 KB) in the temporary memory pool 710 of the volatile memory device 702. The decompressed data 732 in which the compressed data 730 has been decompressed may be stored in the temporary buffer (b) 712.

Next, the controller 240 may transfer the decompressed data to the host processor 110 (S640). According to one embodiment, the swap controller 320 may request the DMA module 310 to transfer the decompressed data. The DMA module 310 may transfer the page data to be swapped in (i.e., the decompressed data) to the host processor 110 or the host memory 120 via the first communication port 220 at the request of the swap controller 320.

Next, the controller 240 may notify the host processor 110 of the completion of processing of the swap-in request (S650). According to one embodiment, the swap controller 320 may notify the host processor 110 of the completion of processing of the swap-in request. The host operating system may recognize that the swap-in request has been processed.

Next, the controller 240 may initialize the information of the metadata of the data (S660). According to one embodiment, the swap controller 320 may initialize the information of the metadata of the page data requested to be swapped in.

The swap controller 320 may request the memory manager 330 to deallocate the storage area. The memory manager 330 may return the storage area to the compressed memory pool at the request of the swap controller 320. For example, the deallocation time point of the storage area may be after the decompressed data has been transferred to the host processor 110. In addition, the deallocation time point of the storage area may be substantially the same as the time point of initializing the information of the metadata of the page data requested to be swapped in. Referring to FIG. 7, the memory manager 330 may deallocate the storage area (a) 722 in the compressed memory pool 720 of the volatile memory device 702.

Further, the swap controller 320 may request the memory manager 330 to deallocate the temporary buffer (b). For example, the deallocation time point of the temporary buffer (b) may be after the decompressed data has been transferred to the host processor 110. The memory manager 320 may return the temporary buffer (b) to the temporary memory pool 710 at the request of the swap controller 320. Referring to FIG. 7, the memory manager 330 may deallocate the temporary buffer (b) 712 in the temporary memory pool 710 of the volatile memory device 704.

According to the electronic device 130 in accordance with the present disclosure, temporary buffers in the temporary memory pool are always returned when a series of decompression and transfer processes are completed, allowing for more efficient management of memory resources. In addition, since the electronic device 130 in accordance with the present disclosure provides offloading to the decompression function and data transmission while expanding the capacity of the host memory 120, overall system performance can be improved.

Figure 8:
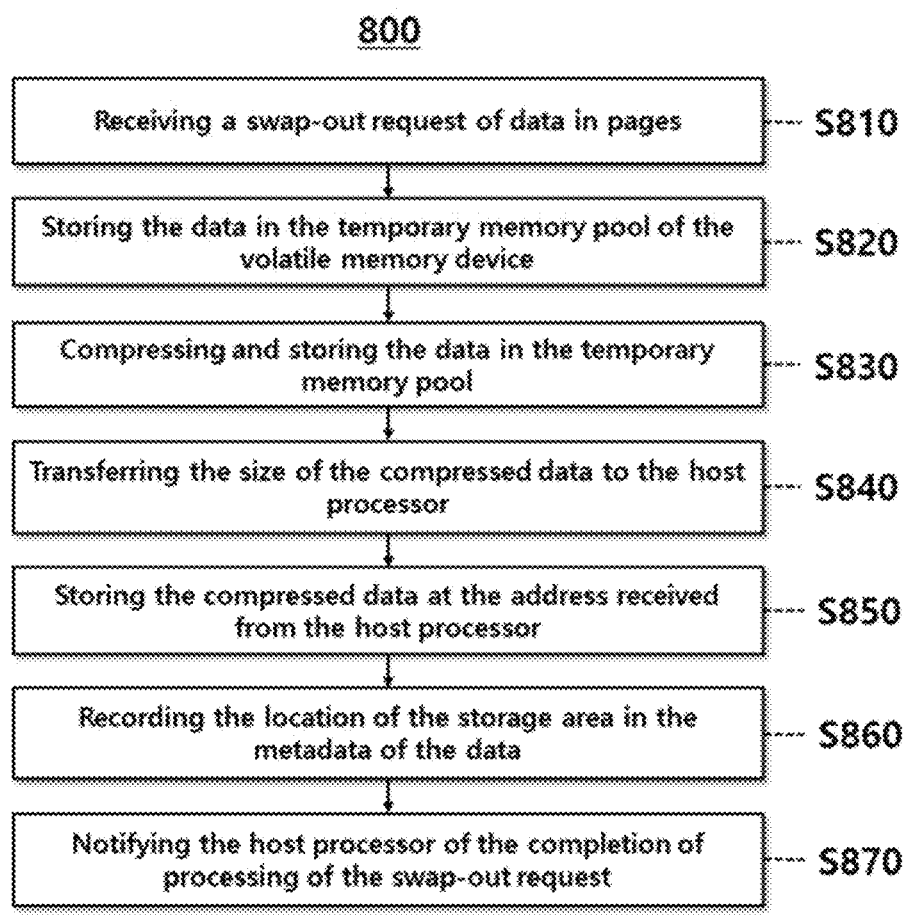
FIG. 8 is a flowchart regarding an operation in which an electronic device processes a swap-out request according to another embodiment of the present disclosure.

FIG. 8 is a flowchart 800 regarding an operation in which an electronic device 130 processes a swap-out request according to another embodiment of the present disclosure.

In the present embodiment, the host operating system performs at least some functions of the management for the compressed memory pool of the volatile memory device 132. Some steps of the embodiment according to FIG. 8 may be the same as or similar to some steps of the embodiment according to FIG. 4, and detailed descriptions of the same or corresponding steps will be omitted. For example, steps S810 to S830 of FIG. 8 may be the same as or correspond to steps S410 to S430 of FIG. 4, and steps S850 to S870 of FIG. 8 may be at least partially the same as or correspond to steps S440 to S460 of FIG. 4.

The controller 240 may receive a swap-out request of data in pages from the host processor 110 (S810). Next, the controller 240 may store the page data in the temporary memory pool of the volatile memory device 132 (S820). Next, the controller 240 may compress and store the page data in the temporary memory pool (S830).

Next, the controller 240 may transfer the size of the compressed data to the host processor 110 (S840). According to one embodiment, when the compressed data in which the page data is compressed by the compression and decompression module 340 is generated, the swap controller 320 may transfer the size of the compressed data to the host processor 110. The size of the compressed data may be identified by the compression and decompression module 340 and transferred to the swap controller 320.

Next, the controller 240 may store the compressed data at the address received from the host processor 110 (S850). According to one embodiment, the host operating system may allocate a storage area in which the compressed data is to be stored in a memory area of the volatile memory device 132. For example, the host operating system may allocate a predetermined area in the compressed memory pool of the volatile memory device 132 as the storage area. The size of the storage area may be equal to or correspond to the size of the compressed data transferred by the swap controller 320. The host processor 110 may transfer the address of the allocated storage area to the controller 240. The swap controller 320 may store the compressed data at the received address. For example, the swap controller 320 may copy the compressed data stored in the second temporary buffer to the storage area.

The swap controller 320 may request the memory manager 330 to deallocate the second temporary buffer. The memory manager 330 may return the second temporary buffer to the temporary memory pool at the request of the swap controller 320. For example, the deallocation time point of the second temporary buffer may be after the compressed data has been copied to the storage area.

Next, the controller 240 may record the location of the storage area in the metadata of the data (S860). Next, the controller 240 may notify the host processor 110 of the completion of processing of the swap-out request (S870).

According to the electronic device 130 in accordance with the present disclosure, since the host processor 110 does not have to directly perform the compression operation function or manage the compressed data, overall system availability can be improved. In addition, according to the computing system 100 in accordance with the present disclosure, the host operating system can directly manage the compressed memory pool.

Figure 9:
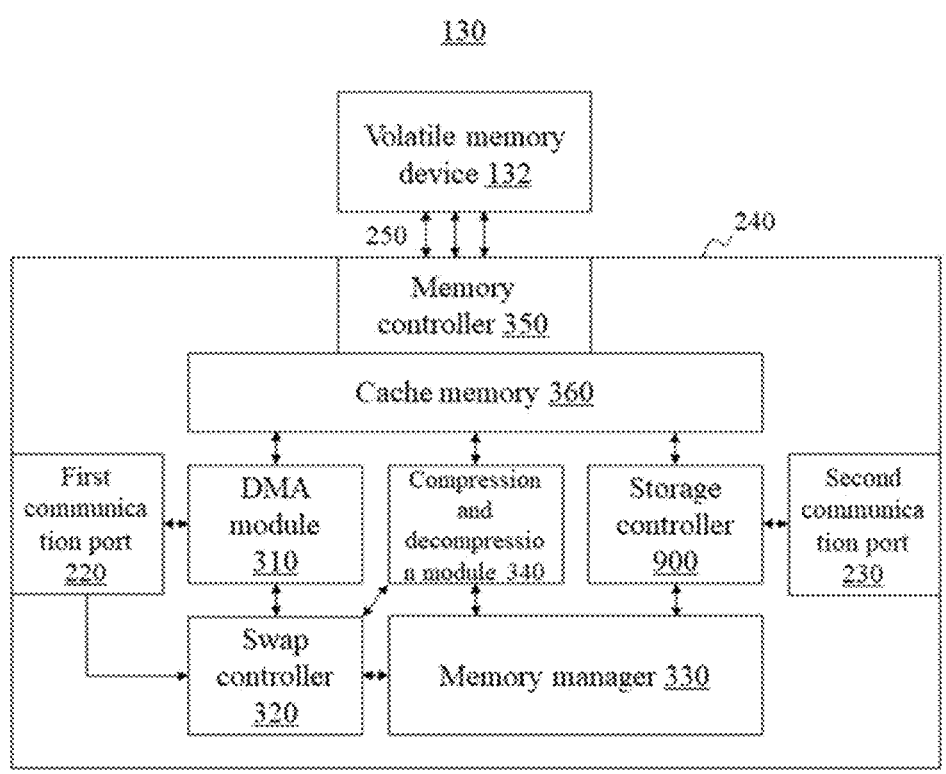
FIG. 9 is a block diagram of a controller in accordance with another embodiment of the present disclosure.

FIG. 9 is a block diagram of a controller 240 in accordance with another embodiment of the present disclosure.

The electronic device 130 in accordance with the present embodiment may swap out the data stored in the volatile memory device 132 to a non-volatile storage device 140. Some components of the embodiment according to FIG. 9 may be the same as or similar to some components of the embodiment according to FIG. 3, and detailed descriptions of the same or corresponding components will be omitted.

As shown in FIG. 9, the controller 240 may further include a storage controller 900. The storage controller 900 may be configured to drive the non-volatile storage device 140 via the second communication port 230, designate addresses in blocks, and perform data reads or writes.

The controller 240 may determine cold data out of the data stored in the compressed memory pool in the volatile memory device 132. According to one embodiment, the memory manager 330 may determine the cold data in the currently allocated compressed memory pool based on information such as time information when the memory was allocated and the frequency of page accesses. The cold data may refer to data that is not frequently accessed and can thus be swapped out to another device, out of the data stored in the compressed memory pool.

The controller 240 may transmit the cold data to the non-volatile storage device 140. The storage controller 900 may swap out the cold data to the non-volatile storage device 140. According to one embodiment, the cold data present in the compressed memory pool may be swapped out in a compressed state. In this case, the storage controller 900 transfers the cold data present in the compressed memory pool to the non-volatile storage device 140 via the second communication port 230 in the compressed state.

According to another embodiment, the cold data present in the compressed memory pool may be decompressed and then swapped out. In this case, the swap controller 320 may be allocated a temporary buffer from the temporary memory pool by requesting the memory manager 330. The compression and decompression module 340 may generate decompressed data by decompressing the cold data at the request of the swap controller 320 and store the decompressed data in the temporary buffer. The storage controller 900 may transmit the decompressed data stored in the temporary buffer to the non-volatile storage device 140. According to the embodiment in which decompressed data is transmitted, a delay may be reduced if an access to the corresponding data is needed again later, compared to the embodiment in which compressed data is transmitted.

Thereafter, the controller 240 may receive a request (swap-in request) for the page data that has been swapped out to the non-volatile storage device 140 from the host processor 110. In response to the request, the swap controller 320 may be allocated a temporary buffer from the temporary memory pool by requesting the memory manager 330. The storage controller 900 may bring the page data to the temporary buffer from the non-volatile storage device 140. The swap controller 320 may transfer the page data stored in the temporary buffer to the host processor 110 via the DMA module 310. If the data brought into the temporary buffer is compressed data, the controller 240 may decompress the compressed data by using the compression and decompression module 340 and then transfer it to the host processor 110 via the DMA module 310.

According to the present disclosure, it is possible to selectively swap out data, which is less required to be retained in the volatile memory device 132 in terms of performance, to the non-volatile storage device 140. According to the present disclosure, overall memory efficiency can be improved by performing a primary swap-out from the host memory 120 to the volatile memory device 132 and a secondary swap-out from the volatile memory device 132 to the non-volatile storage device 140. According to the present disclosure, it is possible to reduce the management burden of the host operating system and improve the performance of the entire computing system 100 by allowing the electronic device 130 to process the swap-out from the volatile memory device 132 to the non-volatile storage device 140.

Figure 10:
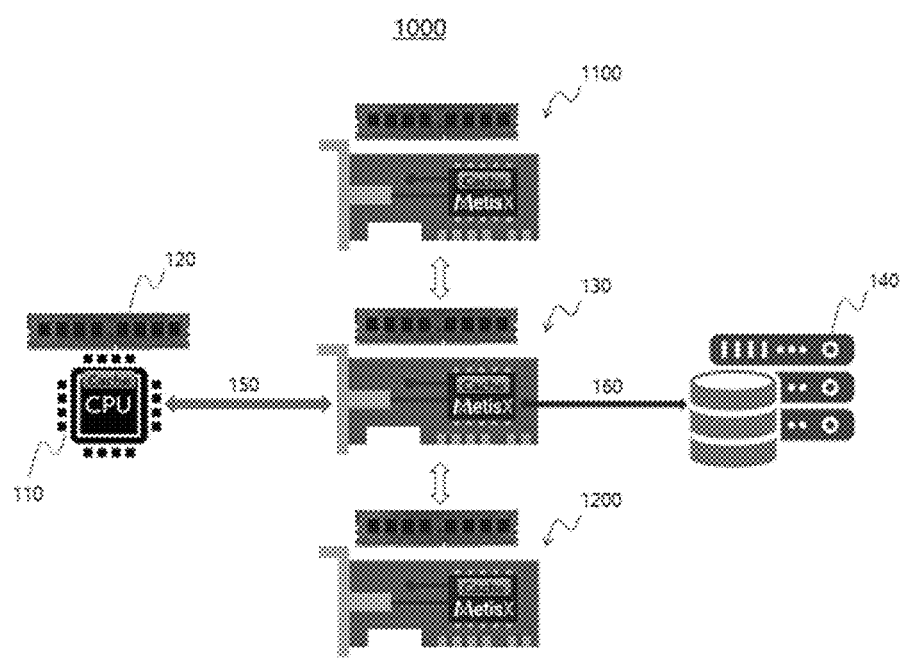
FIG. 10 is an example diagram conceptually illustrating a computing system including an electronic device in accordance with another embodiment of the present disclosure.

FIG. 10 is an example diagram conceptually illustrating a computing system 1000 including an electronic device 130 in accordance with another embodiment of the present disclosure.

The computing system 1000 in accordance with the present embodiment may include a plurality of electronic devices 130, 1100, and 1200. Some components of the embodiment according to FIG. 10 may be the same as or similar to some components of the embodiment according to FIG. 1, and detailed descriptions of the same or corresponding components will be omitted.

The electronic device 130 in accordance with the present disclosure may be connected with the external electronic devices 1100 and 1200. The controller 240 of the electronic device 130 may receive a swap-out request of data in pages not only from the host processor 110 but also from the external electronic devices 1100 and 1200. For example, the controller 240 may generate compressed data by receiving and compressing the corresponding page data in response to the swap-out request of the external electronic device 1100. The controller 240 may store the generated compressed data in the volatile memory device 132.

The controller 240 of the electronic device 130 may receive a swap-in request of data in pages not only from the host processor 110 but also from the external electronic devices 1100 and 1200. For example, the controller 240 may generate decompressed data by decompressing the compressed data in which the corresponding page data is compressed in response to the swap-in request of the external electronic device 1100. The controller 240 may transfer the generated compressed data to the external electronic device 1100.

According to the present disclosure, swap-out and swap-in requests not only from the host processor 110 but also from other electronic devices 1100 and 1200 can be processed. If the electronic device 130 is configured to be connectable with a plurality of other electronic devices 1100 and 1200, management in consideration of the memory availability of each electronic device is possible. Accordingly, the performance of the entire computing system 1000 can be improved.

The methods in accordance with the present disclosure may be computer-implemented methods. Although each step of the corresponding methods has been shown and described in a given order in the present disclosure, the respective steps may also be performed in an order that can be combined arbitrarily according to the present disclosure, in addition to being performed in sequence. In one embodiment, at least some of the steps may be performed in parallel, iteratively, or heuristically. The present disclosure does not exclude making changes or modifications to the methods. In one embodiment, at least some of the steps may be omitted or other steps may be added.

Various embodiments of the present disclosure may be implemented as software recorded on a machine-readable recording medium. The software may be software for implementing the various embodiments of the present disclosure described above. Software may be inferred from the various embodiments of the present disclosure by programmers skilled in the art to which the present disclosure pertains. For example, the software may be machine-readable commands (e.g., code or code segments) or programs. A machine is a device capable of operating according to instructions called from a recording medium, and may be, for example, a computer. In one embodiment, the machine may be the host processor 110, the electronic device 130 or the computing system 100 or 1000 including the same in accordance with the embodiments of the present disclosure. In one embodiment, the processor of the machine may execute the called command and cause the components of the machine to perform functions corresponding to the command. The recording medium may refer to any type of recording medium on which data readable by a machine are stored. The recording medium may include, for example, ROM, RAM, CD-ROM, magnetic tapes, floppy disks, optical data storage devices, and the like. In one embodiment, the recording medium may be implemented in a distributed form over networked computer systems or the like. The software may be stored in a distributed manner and executed on a computer system or the like. The recording medium may be a non-transitory recording medium. A non-transitory recording medium refers to a tangible medium regardless of whether data is stored in it semi-permanently or temporarily, and does not include signals propagating in a transitory manner.

Although the technical idea of the present disclosure has been described by various embodiments above, the technical idea of the present disclosure includes various substitutions, modifications, and changes that can be made within the scope that can be understood by those skilled in the art to which the present disclosure pertains. Further, it is to be understood that such substitutions, modifications, and changes may fall within the scope of the appended claims. The embodiments in accordance with the present disclosure may be combined with each other. The respective embodiments may be combined in various ways according to the number of cases, and the combined embodiments also fall within the scope of the present disclosure.

What is claimed is:

1. An electronic device for compressing and storing data, comprising:
a volatile memory device comprising a first area defined and managed as a compressed memory pool and a second area defined and managed as a temporary memory pool, the second area being different from the first area; and
a controller configured to be connected with a host processor and the volatile memory device,
wherein the controller is further configured to:
receive first data in pages and a swap-out request for the first data from the host processor,
store the first data in a first temporary buffer in the temporary memory pool,
generate first compressed data by compressing the first data in response to the swap-out request,
store the first compressed data in a second temporary buffer in the temporary memory pool,
determine a size of the first compressed data in the second temporary buffer of the temporary memory pool,
allocate the size of the first compressed data in the second temporary buffer in a storage area of the compressed memory pool of the volatile memory device,
store the first compressed data stored in the second temporary buffer in the storage area of the compressed memory pool,
record a location of the storage area in metadata of the first data, and
notify the host processor of completion of processing of the swap-out request,
wherein a size of the allocated storage area of the compressed memory pool corresponds to the size of the first compressed data in the second temporary buffer of the temporary memory pool.

2. The electronic device of claim 1, wherein the controller is further configured to divide and manage the volatile memory device into the compressed memory pool and the temporary memory pool.

3. The electronic device of claim 1, wherein the controller is further configured to:
receive a swap-in request for second data in pages from the host processor,
generate decompressed data by decompressing second compressed data in which the second data is compressed in response to the swap-in request, and
transfer the decompressed data to the host processor.

4. The electronic device of claim 3, wherein the controller is further configured to:
store the decompressed data in a third temporary buffer of a page size in the temporary memory pool, and
transfer the decompressed data stored in the third temporary buffer to the host processor.

5. The electronic device of claim 4, wherein the controller is further configured to:
notify the host processor of completion of processing of the swap-in request, and
initialize metadata of the second data.

6. The electronic device of claim 1, wherein the controller comprises:
a swap controller configured to request allocation of a memory space of the volatile memory device based on page information on the first data included in the swap-out request and control compression of the first data;
a memory manager configured to secure an empty space in the volatile memory device according to a determination of the swap controller; and
a compression and decompression module configured to compress the first data according to the determination of the swap controller.

7. The electronic device of claim 6, wherein the controller further comprises:
a direct memory access (DMA) module configured to receive data to be swapped out from the host processor or transmit data to be swapped in to the host processor by using a predetermined protocol.

8. The electronic device of claim 6, wherein the controller further comprises:
a cache memory configured to store data that has ever been accessed or is expected to be accessed; and
a memory controller configured to be connected with the volatile memory device and the cache memory.

9. The electronic device of claim 3, wherein the controller comprises:
a swap controller configured to identify a storage location of the second compressed data in the volatile memory device based on page information on the second data included in the swap-in request and metadata of the second data, and control decompression of the second compressed data;
a memory manager configured to secure an empty space in the volatile memory device according to a determination of the swap controller; and
a compression and decompression module configured to decompress the second compressed data according to the determination of the swap controller.

10. The electronic device of claim 1, wherein the controller is further configured to:
transfer the size of the first compressed data to the host processor,
receive an address where the first compressed data is to be stored from the host processor, and
store the first compressed data at the received address.

11. The electronic device of claim 1, wherein the controller is further configured to:
determine cold data out of data stored in the compressed memory pool in the volatile memory device, and
transmit the cold data to a non-volatile storage device configured to be connected to the controller.

12. The electronic device of claim 1, wherein the controller is further configured to:
determine cold data out of data stored in the compressed memory pool in the volatile memory device,
generate decompressed data by decompressing the cold data, and
transmit the decompressed data to a non-volatile storage device configured to be connected to the controller.

13. The electronic device of claim 1, wherein the controller is configured to be connected with an external electronic device, and
the controller is further configured to receive a swap-out request for third data in pages from the external electronic device, generate third compressed data by compressing the third data in response to the swap-out request for the third data, and store the third compressed data in the volatile memory device.

14. The electronic device of claim 1, wherein the controller is configured to be connected with an external electronic device, and
the controller is further configured to receive a swap-in request for fourth data in pages from the external electronic device, generate decompressed data by decompressing fourth compressed data in which the fourth data is compressed in response to the swap-in request, and transfer the decompressed data to the external electronic device.

15. A computing system comprising:
a host processor; and
an electronic device,
wherein the electronic device comprises:
a volatile memory device comprising a first area defined and managed as a compressed memory pool and a second area defined and managed as a temporary memory pool, the second area being different from the first area; and
a controller configured to be connected with the host processor and the volatile memory device,
wherein the controller is further configured to:
receive first data in pages and a swap-out request for the first data from the host processor,
generate first compressed data by compressing the first data in response to the swap-out request,
store the first compressed data in a second temporary buffer in the temporary memory pool,
determine a size of the first compressed data in the second temporary buffer of the temporary memory pool,
allocate the size of the first compressed data in the second temporary buffer in a storage area of the compressed memory pool of the volatile memory device,
store the first compressed data stored in the second temporary buffer in the storage area of the compressed memory pool,
record a location of the storage area in metadata of the first data, and
notify the host processor of completion of processing of the swap-out request,
wherein a size of the allocated storage area of the compressed memory pool corresponds to the size of the first compressed data in the second temporary buffer of the temporary memory pool.

* * * * *